Patented July 27, 1926.

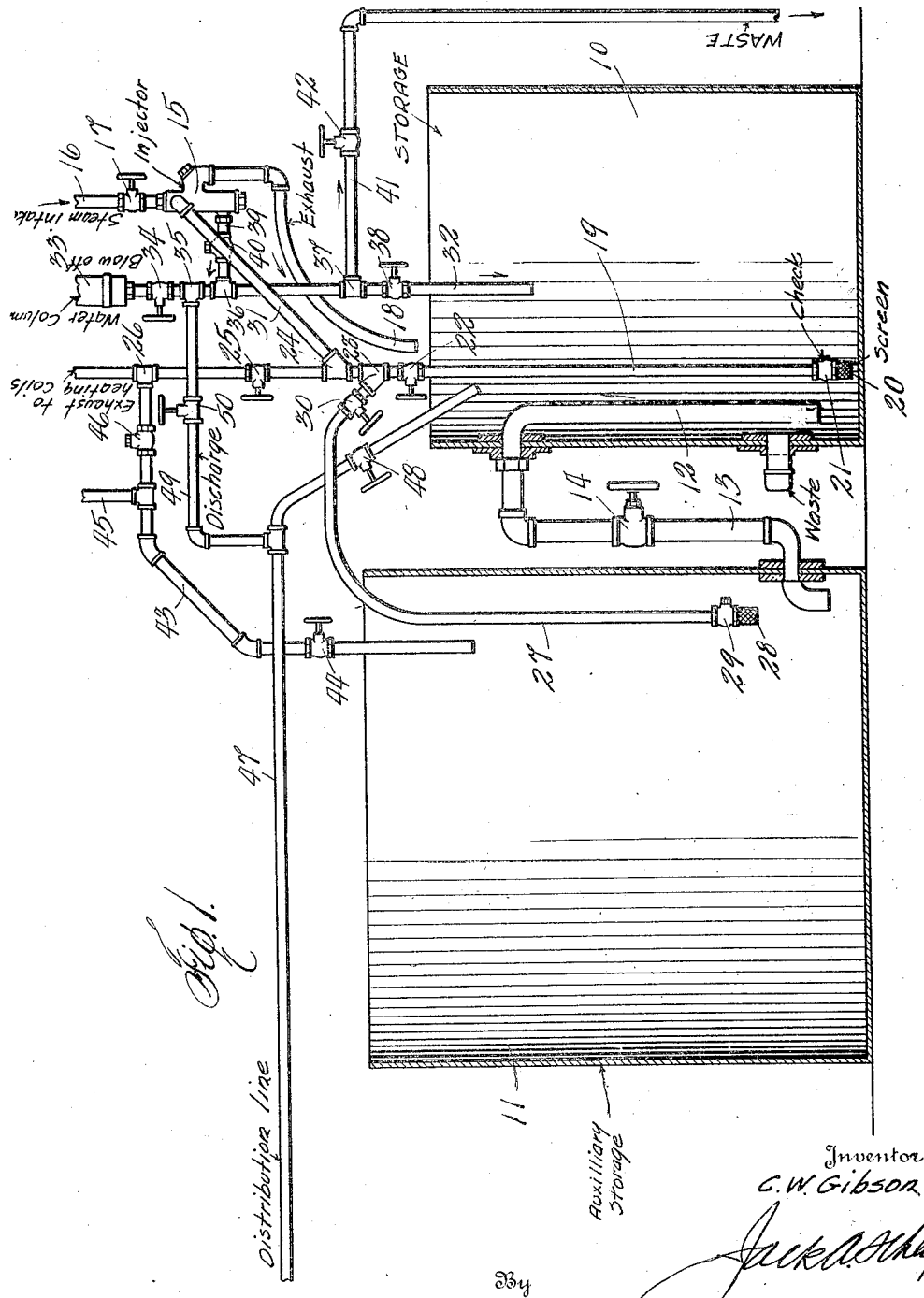

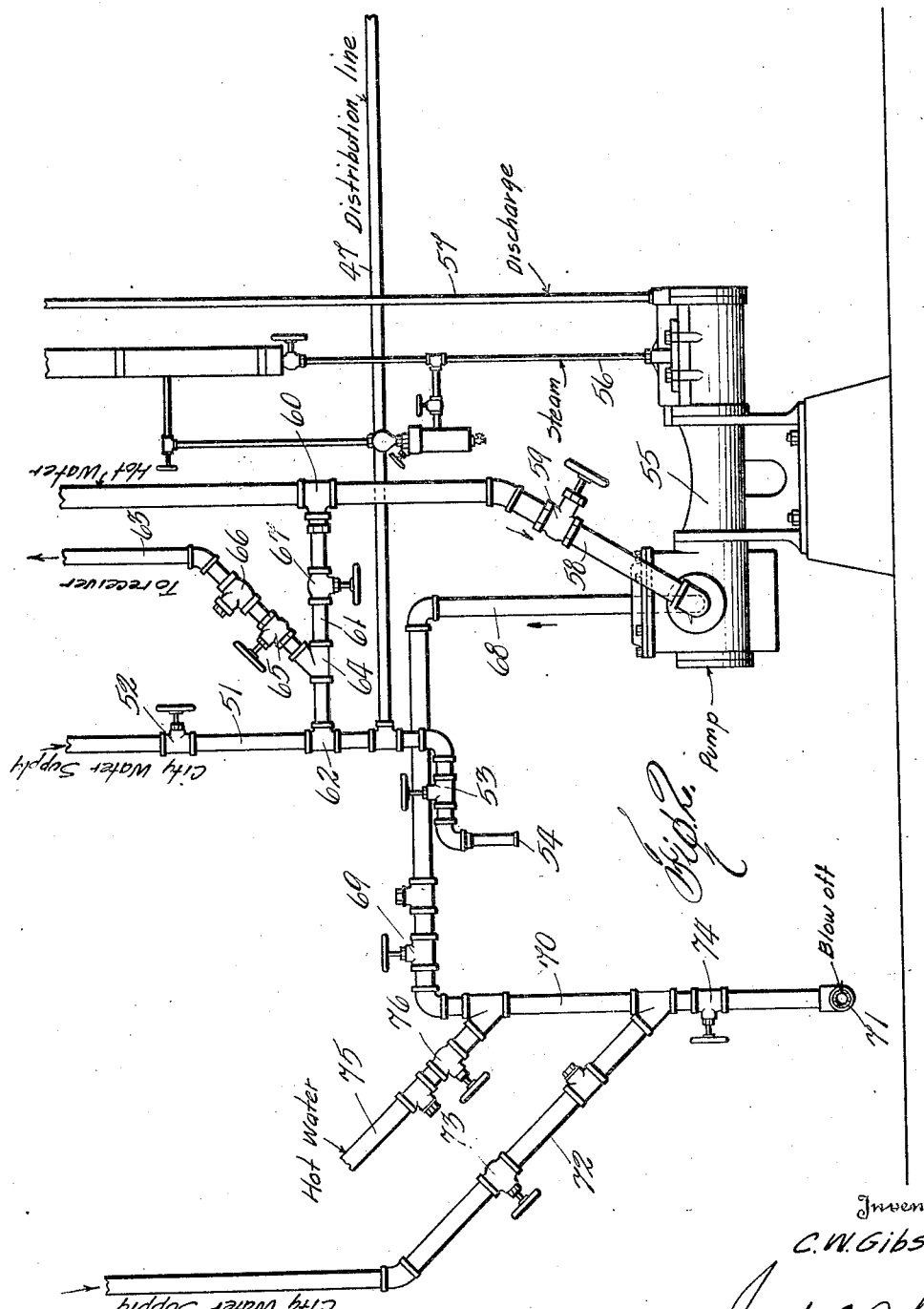

1,593,870

UNITED STATES PATENT OFFICE.

CARL W. GIBSON, OF PORT ARTHUR, TEXAS.

BOILER-COMPOUND-FEEDING SYSTEM.

Application filed December 22, 1924. Serial No. 757,472.

This invention relates to new and useful improvements in boiler compound feeding systems.

This invention has to do with systems of the character described in which compounds for removing incrustation, preventing rust and the like may be injected into the feed water of the boiler.

The object of the invention is to provide a system whereby corrosion, incrustation and foaming may be reduced to a minimum.

A particular object is to provide a system whereby the said compounds may be conveyed from a storage container to the condenser, pump, trap, heater, etc., as well as to the boiler, thus keeping all parts of the steam generating plant in a highly efficient state.

Another object is to provide a system whereby the compound may be segregated and directed to any particular element of the plant, such as a heater, a trap, the boiler or the like.

A further object is to provide a system which is self-cleaning, whereby the compound may be circulated as desired through any particular part or parts.

A still further object is to provide a system whereby exhaust losses are eliminated.

Another object is the provision of a system involving a simple construction and arrangement of pipes and valves at a low cost, thus making installations comparatively easy and readily available under varying conditions.

A construction designed to carry out the invention will be hereinafter described together with other features of the invention.

The invention will be more readily understood from a reading of the following specification and by reference to the accompanying drawings, in which an example of the invention is shown, and wherein:—

Fig. 1 is a diagrammatical view of the system and

Fig. 2 is a similar view of the distributing end of the system.

In the drawings the numeral 10 designates a storage tank and 11 an auxiliary storage tank adjacent thereto. A siphon pipe 12 extending in the tank 10 is connected with a pipe 13 entering the lower end of the tank 11. A globe valve 14 in the pipe 13 controls the passage of liquid from the tank 10 to the tank 11. An injector 15 of the construction is mounted above the tank 10. A steam line 16 including a valve 17 is connected to the upper end of the injector. An exhaust pipe 18 leads from the injector and discharges into the tank 10.

A suction pipe 19 has a screen 20 on its bottom near the bottom of the tank 10 and includes a check valve 21 just above the screen, seating against a back pressure. The suction pipe extends upwardly including, respectively, a valve 22, connections 23 and 24, valve 25 and T 26. A branch suction pipe 27 leads from the connection 23 over and down into the tank 11 and has a screen 28 and check valve 29 on its lower end. The suction pipe 27 includes a globe valve 30 adjacent the connection 23. From the connection 24 a suction pipe 31 extends to the upper portion of the injector.

A pipe 32 extends down from the water column 33 of the boiler. This is a blow-off pipe and includes, respectively, a globe valve 34, connections 35, 36 and 37 and a globe valve 38. A discharge pipe 39 including a check valve 40 leads from the injector to the connection 36. A waste pipe 41 leads from the connection 37 and includes a valve 42. The pipe 19 above the valve 25 and connection 26 is connected with the exhaust from the hot water heater (not shown). A conducting pipe 43 leads from the connection 26 to the tank 11 and includes a globe valve 44 near said tank. A discharge pipe 45 from the fuel pump (not shown) is connected in the pipe 43 and a check valve 46 is included in the pipe 43 between the pipes 19 and 45.

A distribution pipe 47 has one end discharging into the tank 10 and includes a globe valve 48. A discharge pipe 49 including a globe valve 50 leads from the connection 35 of the pipe 32 to the pipe 47. The pipe 47 extends to a water supply pipe 51 including a globe valve 52. Above the valve the pipe 51 has connection with the city water supply. A globe valve 53 is connected to the lower end of the pipe 51 and has a depending nozzle 54 connected therewith. A water pump 55 has a steam line 56 entering its pump cylinder valve and an exhaust pipe 57 leading from said cylinder.

A hot water supply pipe 58 including a globe valve 59 is connected with the pump. A T 60 is also included in the pipe 58. A branch or lateral pipe 61 extends from the T 60 to a T 62 in the pipe 51 between the valve 52 and the pipe 47. A pipe 63 connected with receiver and trap (not shown)

is connected in the pipe 61 at 64 and includes a globe valve 65 with a check valve 66 above. A globe valve 67 is connected in the pipe 61 between the connections 60 and 64. A discharge pipe 68 leads from the the pump to the boiler (not shown) and includes a globe valve 68. The pipe 69 connects with a down pipe 70 which connects with the blow-off pipe 71, which connects with back or low end of boiler. A city water service pipe 72 connects with the pipe 70 and includes a valve 73. A globe valve 74 is connected in the pipe 70 below the pipe 72. Above the pipe 72 a hot water pipe 75 is connected to the pipe 70 and includes a globe valve 76.

In explaining the operation all valves are supposed to be closed and the tank 10 is filled with one kind of a treating compound and tank 11 may be filled with another kind or otherwise as is desired. A hose (not shown) may be attached to the nozzle 54. Cold water may be had at the nozzle by opening valves 52 and 53. If hot water is desired valve 67 is opened instead of valve 52.

The entire system is operated through the injector 15 and this is an important feature of the invention as by its use cleaning compound may be circulated through any part of the plant and is not limited to the boiler alone.

If it is desired to remove incrustation the tank 10 is filled with a proper solution, such as caustic or alkaline solutions, well known in this art, and the valves 22, 17 and 34 are opened. The valve 17 supplies steam to injector from line 16 so that solution from the tank 10 is drawn up through pipe 19 into pipe 31 and passes upward through the water column 33 to the boiler. The solution after flowing through the boiler (not shown) is discharged when the blow-off valve (not shown) of the boiler is opened, whereby all sediment and scale are blown out. This not only cleans the boiler but the water column as well.

If it is desired to fill the tank 10, all valves being closed, the valves 48 and 52 are opened, thus cold water from the service pipe 51 will flow through the pipe 47 to the tank. If hot water is desired the valve 52 is closed and the valve 67 is opened. If steam is desired, all valves being closed, valves 34 and 58 are opened so that steam will flow from the column 33 through the pipe 32 to the tank.

Should it be desired to pass solution through hot water heater, the pump 55 is stopped and all valves being closed, valve 67 is opened. Valves 17, 22 and 50 are opened, whereby steam is supplied to the injector and the solution is drawn up through pipes 19 and 31 as before. For circulating the solution through the receiver and trap (not shown), valve 65 is opened instead of valve 67 and solution received from pipes 47 and 49, the operation being otherwise the same, except that compound solution will be discharged into boiler, thus cleaning all parts through which the solution passes.

If the pump 55 is to be cleaned, valves 17, 22, 50, 67 and 59 are opened whereby discharge from injector 15 will pass through pipes 39, 49, 47, 51, 61 and 58 to the pump. The compound solution will then be discharged through pipes 68 and by opening valves 69 and 74 the solution will be fed to the boiler through pipe 70.

City water service pipes 51 and 72 may be cleaned by cutting off the main service valve (not shown) and opening the valve 52, then opening valves 17, 22, 50, and 73, whereby the injector will force the solution from pipe 47 through the pipes 51, 70 and 72. After this is done injector is cut off and valves 50 and 52 are closed, then main service valve is opened and the city water pipes are washed out.

For cleaning floors and equipment a hose may be attached to the nozzle 54 and a soap and lye solution made up in the tank 10. The injector 15 is started as before and the solution discharged through pipe 47, valve 53 being opened, to the hose. For all cleaning purposes it will be noted that valves 22 and 30 are opened for a supply of liquid from the tanks 10 and 11 by suction; while discharge or distribution is had by opening valves 34, 50, 38 and 48.

By means of the auxiliary storage tank 11, the exhausts of the solution from various elements are saved and may be reused. By reason of the check valve 46 fluids from the pipes 43 and 45 cannot pass into the pipe 19. All exhausts coming through pipe 45 pass to the pipe 43 and thence to tank 11. When valve 25 is opened and valve 22 is closed suction from pipe 19 above valve 22 will communicate through pipe 31 to the injector; also when the injector is not operating and valve 25 is closed water may pass from the T 26 on pipe 19 past check valve 46 and through pipe 43 to the tank 11.

If it is desired to take a solution out of the auxiliary tank 11, valve 30 is opened whereby solution is drawn up through pipes 27, 19 and 31 to the injector, the same being operated by opening valve 17. Then by opening valve 34 solution is conducted to the boiler through water column 33; or by closing valve 34 and opening valve 50 solution will be discharged into pipes 49 and 47. It is obvious that by manipulating the different valves various circulations of the fluids may be had and it is not deemed neccessary to describe them all.

What I claim, is:—

1. In a system for supplying a detergent solution, a storage tank therefor, a suction conductor for conveying the fluid from the tank, a steam operated means for impelling the fluid through the conductor, a distributing head connected to the impelling means, and a plurality of distributing conductors communicating with the head and each controlled by a cut-off valve.

2. In a system for supplying a detergent solution, a storage tank therefor, a suction pipe leading from the tank, a steam injector to which the suction pipe is connected, a discharge from said injector, a distributing head connected to the discharge, and valved distribution pipes leading from said head.

3. In a system for supplying a detergent solution, a storage tank therefor, a suction pipe leading from the tank, a steam injector to which the suction pipe is connected, a discharge from said injector, a distributing head connected to the discharge, valved distributing pipes leading from the head, and a valved return pipe from said head to the tank.

4. In a system for supplying a detergent solution, a storage tank therefor, a suction pipe leading from the tank, a stem injector to which the suction pipe is connected, a liquid discharge pipe from the injector, a distributing head connected to the discharge pipe, a plurality of distributing pipes connected with the head and each having a cut-off valve, a water supply for said head including a cut-off valve, and a return pipe leading from the discharge pipe to the tank.

5. In a system for supplying a detergent solution, a pair of storage tanks, a steam injector, suction lines leading from the tanks and each including a cut-off valve, said suction lines being connected to the injector, and a liquid distributing line leading from the injector.

6. In a system for supplying a detergent solution to a steam generating plant, the combination with a water column and a steam line, of a storage tank for the solution, a steam injector connected with the steam line, a suction pipe extending from the storage tank to the injector valve, a discharge pipe connected with the injector and the water column and a valved distributing pipe connected with said discharge pipe.

7. In a system for supplying a detergent solution, the combination with a water column and steam line, of a storage tank for the solution, an injector connected with the steam line, a suction pipe extending from the tank to the injector, a valved discharge pipe connected with the injector and water column, a valved distributing pipe connected to said discharge pipe, and a valved return pipe extending from the discharge pipe to the tank.

8. In a system for supplying a detergent solution, a storage tank, a steam line, an injector connected with the steam line, a suction line including a cut-off valve leading from the tank to the injector, a discharge pipe leading from the injector, a distributing coupling connected with the discharge pipe, distributing lines connected with the coupling, a return line from the coupling having one end discharging into the tank and including a cut-off valve, a cold water supply pipe having a valve and connected with the coupling, and a hot water supply pipe including a valve and connected with said supply pipe.

9. In a system for supplying a detergent solution, a storage tank, a steam line, an injector connected with the steam line, a suction line including a cut-off valve and leading from the tank to the injector, a discharge pipe leading from the injector, a valved return pipe from the discharge pipe to the tank, a distributor coupling connected with the discharge pipe and including a cut-off valve, a plurality of distributing pipes connected with the couplng, a water supply pipe connected with one end of said coupling, a hot water supply line having a valve and connected with the coupling, and an outlet including a valve connected with the coupling.

In testimony whereof I affix my signature.

CARL W. GIBSON.